(12) United States Patent
Sutterlin et al.

(10) Patent No.: US 6,741,571 B1
(45) Date of Patent: May 25, 2004

(54) METHOD AND APPARATUS FOR USING UNINTENDED RADIO FREQUENCY PROPAGATION IN A NETWORK

(75) Inventors: Philip H. Sutterlin, Saratoga, CA (US); Alex Chervet, Fremont, CA (US)

(73) Assignee: Echelon Corporation, San Jose, CA (US)

(*) Notice: Subject to any disclaimer, the term of this patent is extended or adjusted under 35 U.S.C. 154(b) by 0 days.

(21) Appl. No.: 09/240,554

(22) Filed: Jan. 29, 1999

Related U.S. Application Data

(62) Division of application No. 08/693,662, filed on Aug. 8, 1996.

(51) Int. Cl.[7] .............................................. H04L 12/28
(52) U.S. Cl. ....................... 370/254; 370/255; 370/400; 370/410
(58) Field of Search ................................ 370/254, 255, 370/400, 410, 475, 313, 310, 338; 709/232, 245; 340/310.01, 505, 825.69, 825.52; 235/462.46, 472.02

(56) References Cited

U.S. PATENT DOCUMENTS

| | | | |
|---|---|---|---|
| 4,558,177 A | 12/1985 | Corris et al. | |
| 4,637,718 A | * 1/1987 | Kirchner et al. | 356/71 |
| 4,788,527 A | 11/1988 | Johansson | |
| 4,912,553 A | 3/1990 | Pal et al. | |
| 4,918,690 A | 4/1990 | Markkula et al. | |
| 5,192,231 A | 3/1993 | Dolin, Jr. | |
| 5,280,159 A | * 1/1994 | Schultz et al. | 235/382 |
| 5,327,230 A | 7/1994 | Dockery | |
| 5,444,695 A | 8/1995 | Copley et al. | |
| 5,475,687 A | * 12/1995 | Markkula, Jr. et al. | 709/224 |
| 5,553,081 A | 9/1996 | Downey et al. | |
| 5,574,979 A | 11/1996 | West | |
| 5,671,195 A | 9/1997 | Lee | |
| 5,861,817 A | * 1/1999 | Palmer et al. | 340/5.91 |

* cited by examiner

*Primary Examiner*—Chi Pham
*Assistant Examiner*—Alexander O. Boakye
(74) *Attorney, Agent, or Firm*—Blakely, Sokoloff, Taylor & Zafman LLP

(57) ABSTRACT

An improvement in a network is described where messages are communicated over different somewhat unconnected branches of a network. The invention is used where the messages cause radio frequency radiation from lines in the network which typically is unintended. The radiation from one branch is sensed and the signal representing the radiation is coupled into the other branch by a direct electrical connection to the other branch. A mechanism is provided to prevent undesirable rebroadcasting of messages.

3 Claims, 3 Drawing Sheets

METHOD AND APPARATUS FOR USING UNINTENDED RADIO FREQUENCY PROPAGATION IN A NETWORK

This application is a division of application Ser. No. 08/693,662, filed Aug. 8, 1996.

BACKGROUND OF THE INVENTION

1. Field of the Invention

The invention relates to networks, particularly those having a plurality of nodes where information is transmitted between the nodes.

2. Prior art

In U.S. Pat. No. 4,918,690 a network is described which includes a plurality of nodes. Each node includes a cell having a unique identification number. The network is initialized through use of the identification numbers of the cells and then a protocol is established so that the cells may communicate among one another over a medium such as a power line, twisted pair, coaxial cable, etc.

In some cases the cells are in different branches of the network and transmission of a high frequency data signal from one cell to another is not always successfully completed through the medium/media. For instance, some cells may be connected to one phase of a power line while other cells are connected to another phase of the power line. High frequency communications between these lines may not be practical because of the impedance to the high frequency signal found in a power network. A power line communications coupler for solving this problem for some applications is described in U.S. Pat. No. 5,192,231. A problem with this coupler is that it requires a direct connection to each of the branches, phases, or the like of the medium/media.

Sometimes it is not convenient to obtain communications signals from the network. For instance, identification numbers (IDs) for nodes needed to initialize the network may be difficult to obtain from each node, because for example, each node is not addressable until its ID is initially determined. As will be seen, the present invention provides a mechanism for obtaining signals from the networks such as the IDs without physically connecting into the network.

SUMMARY OF THE INVENTION

In a network having a first and a second branch, a method for coupling a signal from the first branch to the second branch is disclosed. A radio signal propagated from the first branch of the network is sensed. This signal is coupled to the second branch of the network by an electrical connection to the second branch. Thus, the unintended radio frequency transmission of a signal is sensed and put to use.

In one embodiment of the present invention the network nodes are separately caused to transmit their IDs onto the network. These IDs are sensed by a radio frequency receiver and tabulated. Then this tabulated information is transmitted onto the network to allow, for instance, a gateway node to initialize the network.

DETAILED DESCRIPTION OF THE PRESENT INVENTION

A method and apparatus in a network for sensing data signals from unintentional radio frequency propagations and thereafter using the data signals in the network is described. The term network as used below generally refers to a plurality of nodes interconnected by a physical conductor such as a power line or twisted pair lines. In the following description, numerous specific details are set forth such as specific frequencies in order to provide a thorough understanding of the present invention. It will be apparent to one skilled in the art that the present invention may be practiced without these details. In other instances well-known devices such as radio frequency (RF) receivers are not shown in detail in order not to unnecessarily obscure the present invention.

One Problem Solved by the Present Invention

Figure 1:
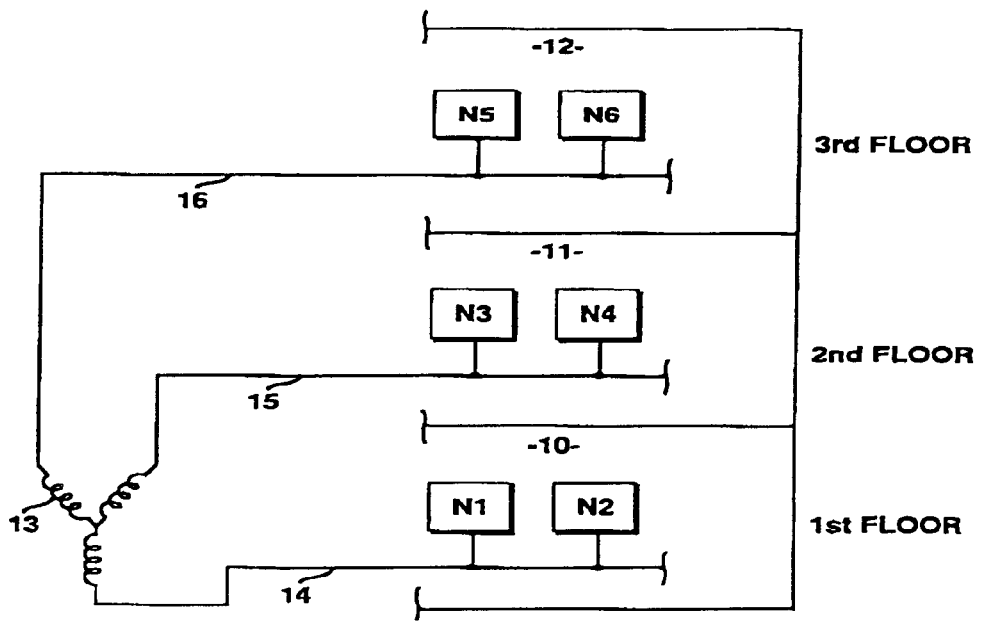
FIG. 1 illustrates a three phase power distribution network with nodes connected to each phase of the network. This diagram is used to illustrate a problem solved by the present invention.

Referring first to FIG. 1, a source 13 of three-phase power is illustrated with one phase of the power being distributed to each of the lines 14, 15 and 16. (Ground/return lines are not illustrated since they are not needed for the present explanation). Assume, as is illustrated in FIG. 1, that each phase of the power is distributed to one floor of a building. Specifically, floor 10 (first floor) receives the power from line 14, floor 11 receives power from line 15, and floor 12 receives power from line 16. Additionally assume that a plurality of nodes are coupled to lines 14, 15 and 16 such as nodes N1–N6. Each of these nodes may include a cell having distributed intelligence and a transceiver for communicating over a power line. These nodes and the power lines form a network such as is described in U.S. Pat. No. 4,918,690.

If node N1 has a message for node N5, the message must be transmitted through the source 13. The source 13 typically involves a transformer or the like which does not provide an effective transmission path for a data signal having a frequency much higher than the power frequency. For instance, where each node includes a transceiver such as manufactured by Echelon Corporation, part no. PLT-20/21, signals are transmitted between the nodes at a frequency (when compared to 60 Hz) of 131.5789 kHz. This relatively high frequency is in some instances not effectively transmitted from line 14 to lines 15 or 16 through a transformer.

Thus, using the power line as a communications medium for the network of FIG. 1 and many other networks presents a real problem. A similar problem exists for other media such as for example, twisted pair or coaxial cable where different branches of a network are remote from one another or where other network anomalies exist.

One Embodiment of the Present Invention

Figure 2:
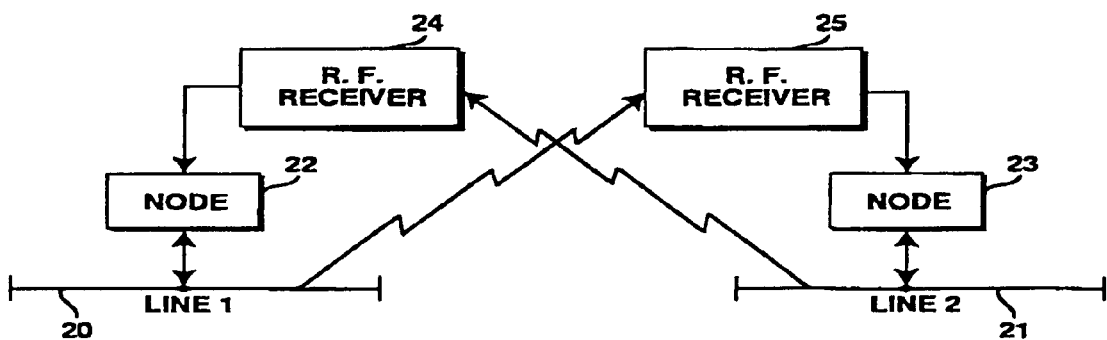
FIG. 2 is a block diagram illustrating the present invention where data is communicated between two lines or branches of a network by repeaters.

In FIG. 2, two lines of a network, lines 20 and 21, are illustrated. It is assumed for purposes of discussion that these lines are not connected in a way that permits effective distribution of a high frequency (e.g., 132 kHz) communications signal. For instance, one line of FIG. 2 may be line 14 of FIG. 1 and the other line of FIG. 2, line 15 of FIG. 1.

When a communications signal is transmitted in a network at a frequency of, for example, 132 kHz, unintended propagation of radio waves occurs from the network at the frequency of the communications. This is the case for power lines and twisted pairs and the like, and to a lesser extent, for coaxial, cable. For the most part this propagation is considered as undesirable since it can cause interference with electronic equipment not associated with the network.

As shown in FIG. 2, this unintended radio frequency propagation is used in the present invention to couple data signals from one line to the other by the repeaters shown. If a communication signal is transmitted over line 21, propagation occurs from line 21 and is sensed by the RF receiver 24. This receiver provides a signal representative of the RF signal sensed from line 21, and couples it onto line 20 through node 22. Thus, if a particular data packet is transmitted on line 21 it is sensed by the RF receiver 24 and the data packet is coupled through the node 22 onto line 20 via a direct connection to the line 20 using commercially available transceivers. These transceivers provide either direct magnetic coupling or direct electrical connection to line 20. Generally, the data sensed by the RF receiver is rebroadcast on to the other line at the same frequency used in the first line. Similarly, data transmitted on the line 20 causes propagated RF signals from the line 20. These signals are sensed by the radio frequency receiver 25 and a signal representing these RF signals is coupled to the line 21 through the node 23.

The RF receivers 24 and 25 may be ordinary radio frequency receivers tuned to receive signals of the frequency of the communication signal in the network (e.g., 132 kHz). They may include antennas suitable for receiving the RF signals. If a spread spectrum signal is to be sensed then a broader band receiver and antenna are needed.

The RF radiation generally propagates from one floor of a building to another, thus the RF receiver and node connect to, for example, line 15 of FIG. 1 at floor 11 of the building will sense RF data propagating from line 14 or line 16. Thus, in the example of FIG. 1 using the invention of FIG. 2, it is unnecessary to physically interconnect lines 14, 15 or 16 with an effective conductor of the high frequency signals.

When RF data signals are transmitted on line 20 they are sensed by receiver 24 as well as the receiver 25. The node 22 includes a circuit for comparing signals on line 20 with the signals from the receiver 24, and if the two are the same, prevents rebroadcasting of a message from line 20 back onto line 20 when it is sensed by the receiver 24. Similarly, the node 23 prevents signals from line 21 from being rebroadcast onto line 21 when they are sensed by the receiver 25. This however is not necessary. Rather without this feature the data signals would be transmitted back onto its own line one extra time and not more then once because of the feature shown in FIG. 5.

Additionally, a mechanism is used to prevent the continual rebroadcast of a single message. Consider a message on line 20 which is sensed by the receiver 25 and retransmitted onto line 21. The retransmission onto line 21 will be sensed by receiver 24 and may be coupled back onto line 20. This is different than what was described in the preceding paragraph because of the time delay associated with the message being coupled back to the line which was its source. This retransmission is prevented by the mechanism shown in FIG. 5.

Figure 5:
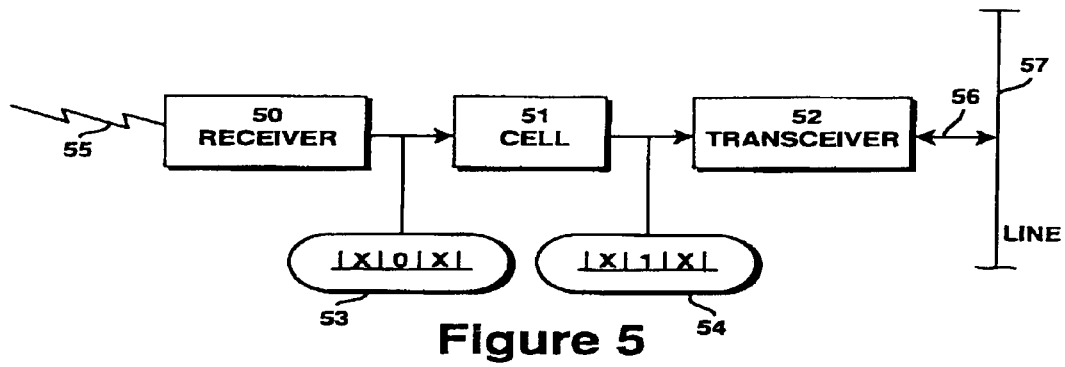
FIG. 5 is a block diagram illustrating a modification made to messages transmitted from one network branch to another which prevents the retransmission of messages.

In FIG. 5 a repeater node having an RF receiver 50, cell 51 and transceiver 52 which is coupled to the network line 57 via line 56 is shown. The receiver 50 is shown receiving a propagated signal 55 which, for example, is propagated from line 21 of FIG. 2. This signal typically represents a plurality of bits comprising a message. A portion of such a message is shown in bubble 53, specifically three bits "X0X". The message including the three bits are coupled to the cell 51. The cell 51 is coupled to the transceiver 52 which transmits the message onto line 57 through line 56 unless the cell determines that the message is the same as a message on line 57. The cell 51 changes, in one embodiment, the state of a predetermined bit in the message to indicate that the message has been received by the RF receiver and has been transmitted onto the network. This is shown by the bubble 54 where the "0" bit has been changed to "1".

Thus, in operation when a message is received on line 55, the state of a bit in a predetermined field as shown within bubble 53 is first examined to determine if the message has previously been received by a receiver and transmitted onto a line. For instance, if the "0" in bubble 53 is a "1", the cell 51 would not couple the message to the transceiver 52. If the bit is a "0" the cell 51 changes the bit to a 1 as shown within the bubble 54 and couples the message to the transceiver 52 for transmitting onto the network line 57.

While in FIG. 5 the changing of state of a single bit is used to indicate that a message has been previously received and transmitted, other mechanisms may be used.

Figure 6:
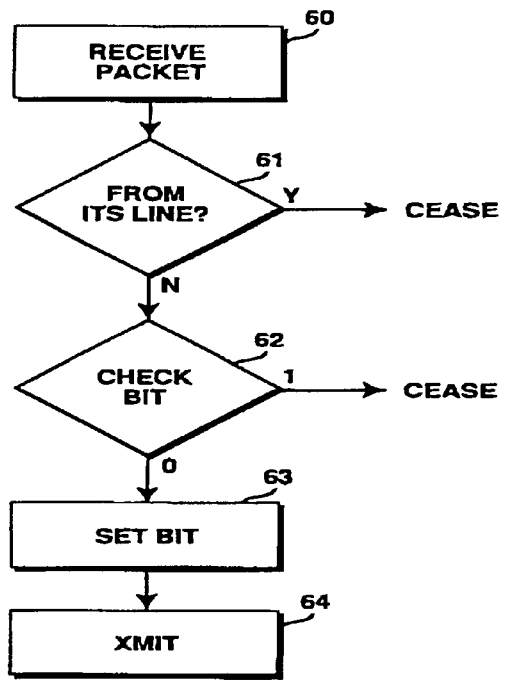
FIG. 6 illustrates a series of steps of the present invention.

The method implemented by the repeater of FIG. 5 is shown in FIG. 6. First, as shown by step 60, a message or packet is received. This message is compared with messages from the line to which the node is coupled. That is, for example, referring again to FIG. 2, if a message on line 20 is received by the receiver 24 it is not coupled back onto line 20 from node 22 since the node 22 compares the messages received by receiver 24 to those on line 20 as described earlier. This is shown by the step 61 of FIG. 6. Note as mentioned earlier this is not necessary and without it the message could be transmitted onto the originating line one time. If the comparison shows that the messages is from the line to which the node is connected, the message is simply ignored. If not, the message is examined to determine the state of the bit shown in bubbles 53 and 54 of FIG. 5. This is step 62 of FIG. 6. For the specific logic shown in FIG. 5, if the bit is a "1" then the message is not transmitted onto the line. On the other hand, if the bit is a "0" the state of the bit is changed as shown by step 63 and the message is then transmitted onto the line associated with the node as shown by step 64.

Alternate Embodiment Using a Principle of the Present Invention

It is sometimes difficult in initializing a network to determine the ID of each cell. More specifically, assume that each cell has a unique ID. To initialize the network and group the cells, it is necessary to know each cell ID and the node each cell is at. Each cell includes a mechanism for causing it to broadcast its ID. Some cells include a service pin which when grounded, causes the cell to broadcast its ID onto a network.

Figure 3:
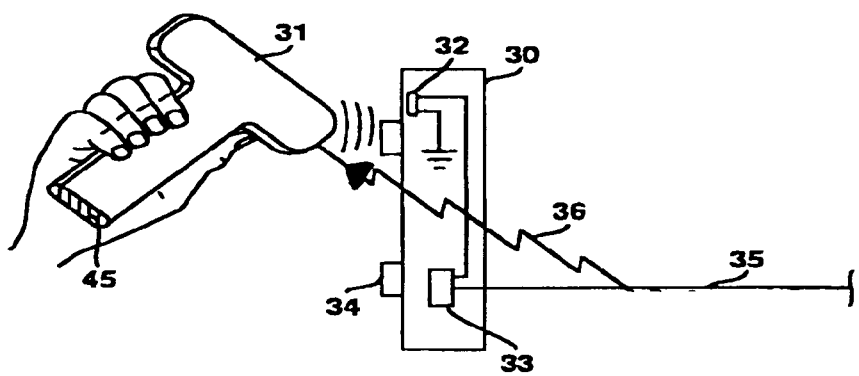
FIG. 3 illustrates a hand-held device used in another embodiment of the present invention for causing data to be transmitted onto the network and for sensing the data.

In FIG. 3 one such cell 33, is shown housed within a wall receptacle 30. A push-button 34 is coupled to cell 33 allowing the cell to sense the state of the button. The cell 33 is coupled to a network via a line 35. The service pin of the cell 33 which causes the cell to broadcast its unique ID is coupled to a magnetically activated switch 32.

A battery powered hand-held device 31 shown in FIG. 3 includes a magnet which causes the switch 32 to ground the service pin of the cell 33 when brought into proximity to the switch. When this occurs the cell 33 broadcasts its ID onto the line 35. An RF receiver is contained within the device 31 and senses the ID of the cell 33 as an RF signal propagates from line 35. This ID is stored within the device 31 and is subsequently associated with the node represented in FIG. 3.

Figure 4:
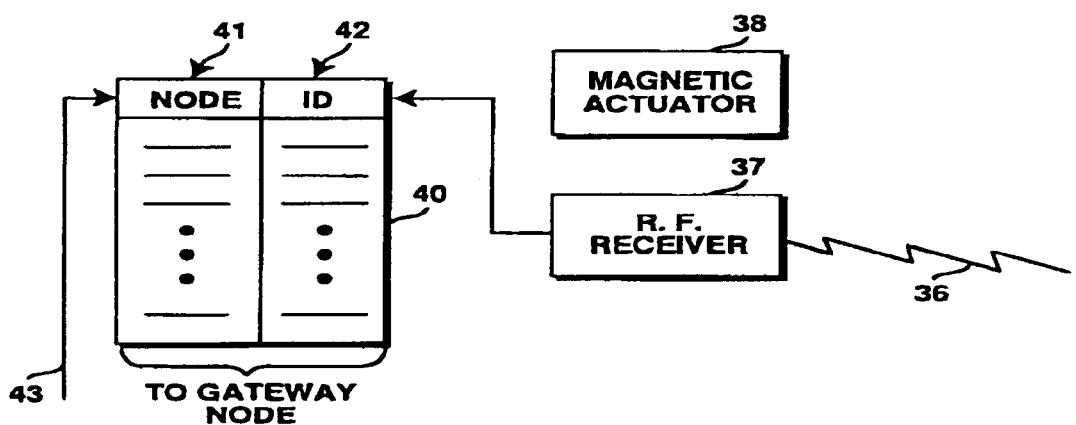
FIG. 4 is a block diagram illustrating the major components of the hand-held device of FIG. 3.

Referring to FIG. 4, the device 31 of FIG. 3 is shown to include an actuator 38 which may be a magnet for closing the switch 32 and an RF receiver 37 which is tuned to receive signals from the line 35.

The ID signals sensed by the receiver 37 are coupled to a memory which may be a dynamic-random-access-memory, non-volatile memory such as an EEPROM or the like. This memory is represented by table 40 in FIG. 4 and includes two columns. One column 42 for storing IDs and the other column 41 for storing signals representing the node associated with the ID. The nodes typically are numbered or otherwise identified and a signal is manually inserted through, for example, a keyboard via line 43 from the device 31 to indicate the node immediately before or after the ID is sensed in order to create the table. The device 31 may include a cell or other microcomputer for extracting the ID from the message broadcast by the cell when the service pin is grounded. This cell or computer also controls the building of the table 40 and the reading of data from the table.

Once the table is created, the device 31 is placed in a reader to allow the contents of the memory to be read via an electrical connector 45. The reader is coupled to, for example, a gateway node thus allowing the gateway node to prepare messages directed to individual nodes since the ID of each of the nodes is now known.

With the device 31 of FIG. 3, it is readily apparent that there is no need to physically connect to line 35 to sense the IDs for each of the nodes. The node/ID relationship can be quickly determined by simply moving from node to node, activating the switch 32 and sensing the associated ID number for the node.

Mechanisms other than a magnetically actuated switch may be used to ground the service pin of a cell. For instances, switches concealed behind pin holes may be used as well as other well-known mechanisms.

Thus, the unintended radiation from lines in a network is put to good use for coupling messages between lines in the network and for initializing the network.

What is claimed is:

1. In a network having a plurality of nodes physically connected by a medium where each node has an identification number, a method for collecting the identification numbers comprising:

separately activating each node from outside the network causing the node to broadcast its identification number onto the network;

determining the identification numbers from radio waves propagated from the network by sensing a network line from which the radio waves propagate without being physically connected to line; and recording each of the identification numbers in a memory; and creating in the memory a table associating each identification number with its associated node.

2. The method defined by claim 1 wherein the memory is a dynamic-random-access-memory (DRAM).

3. The method defined by claim 1 wherein activating the node includes magnetically grounding a service pin of a cell contained in the node.

* * * * *